No. 638,463. Patented Dec. 5, 1899.
T. W. JUST.
TORPEDO.
(Application filed Jan. 26, 1899.)
(No Model.) 3 Sheets—Sheet 1.
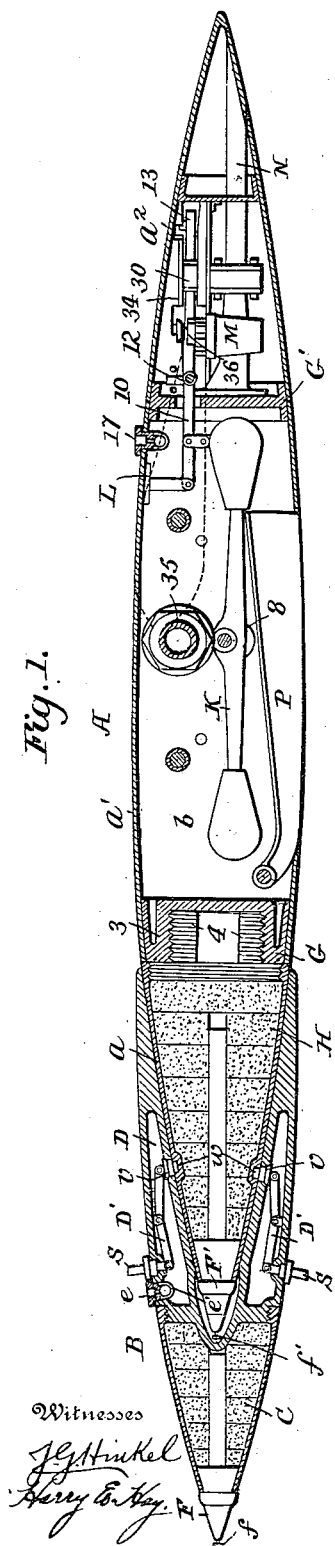
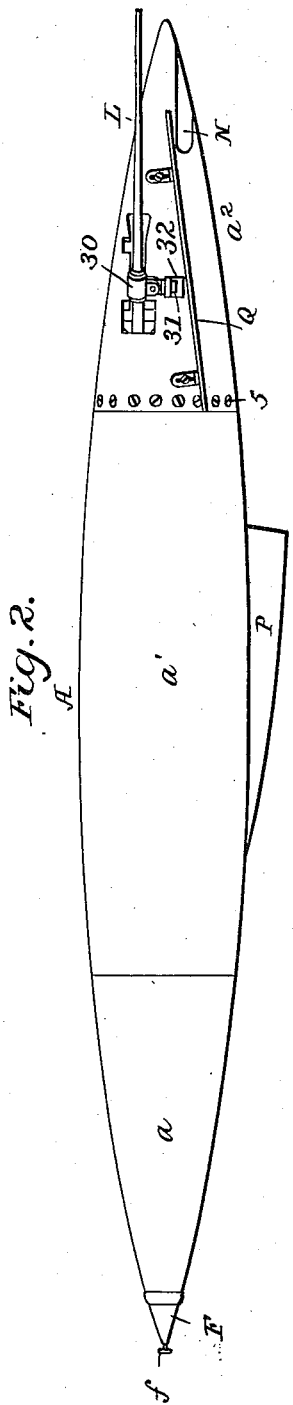
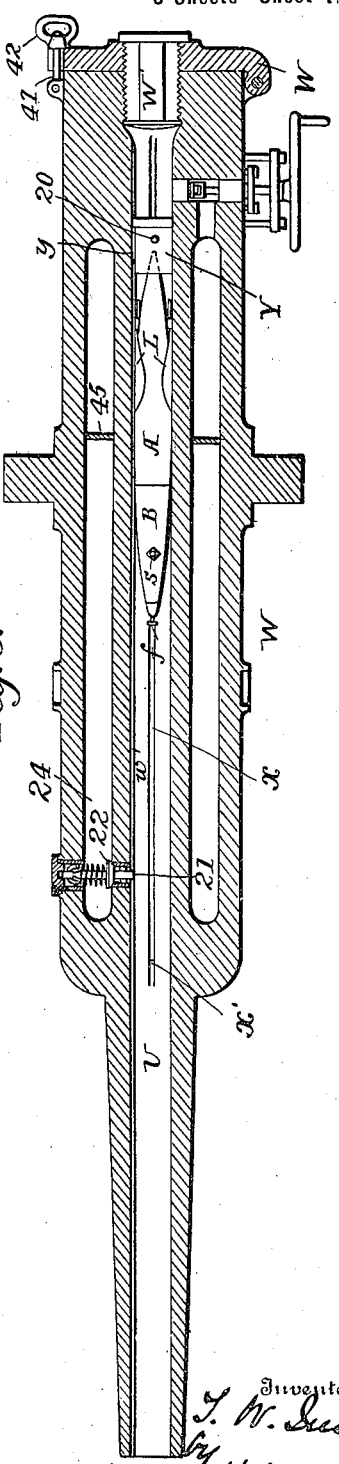
Witnesses
Inventor
Attorneys

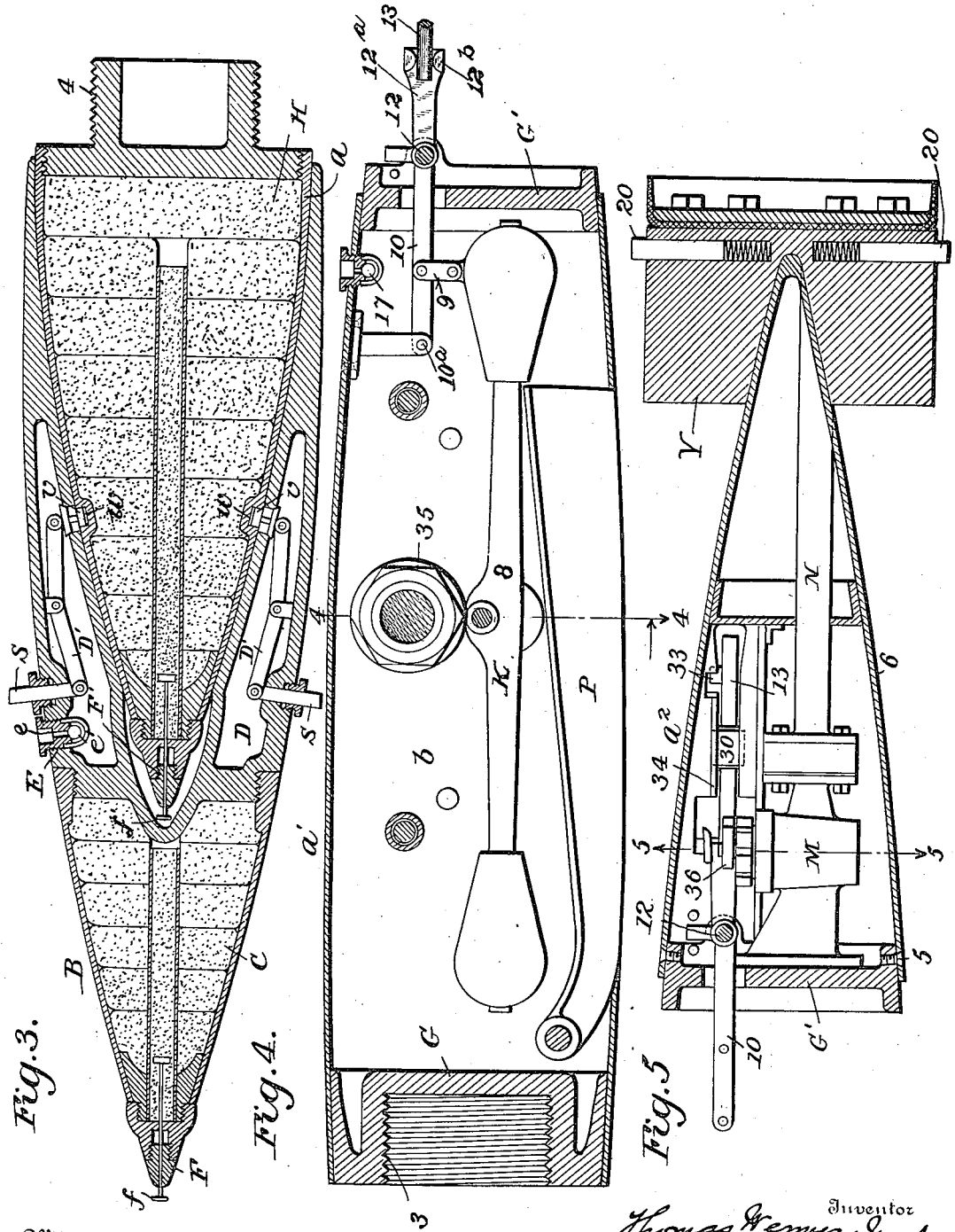

No. 638,463. Patented Dec. 5, 1899.
T. W. JUST.
TORPEDO.
(Application filed Jan. 26, 1899.)
(No Model.) 3 Sheets—Sheet 3.
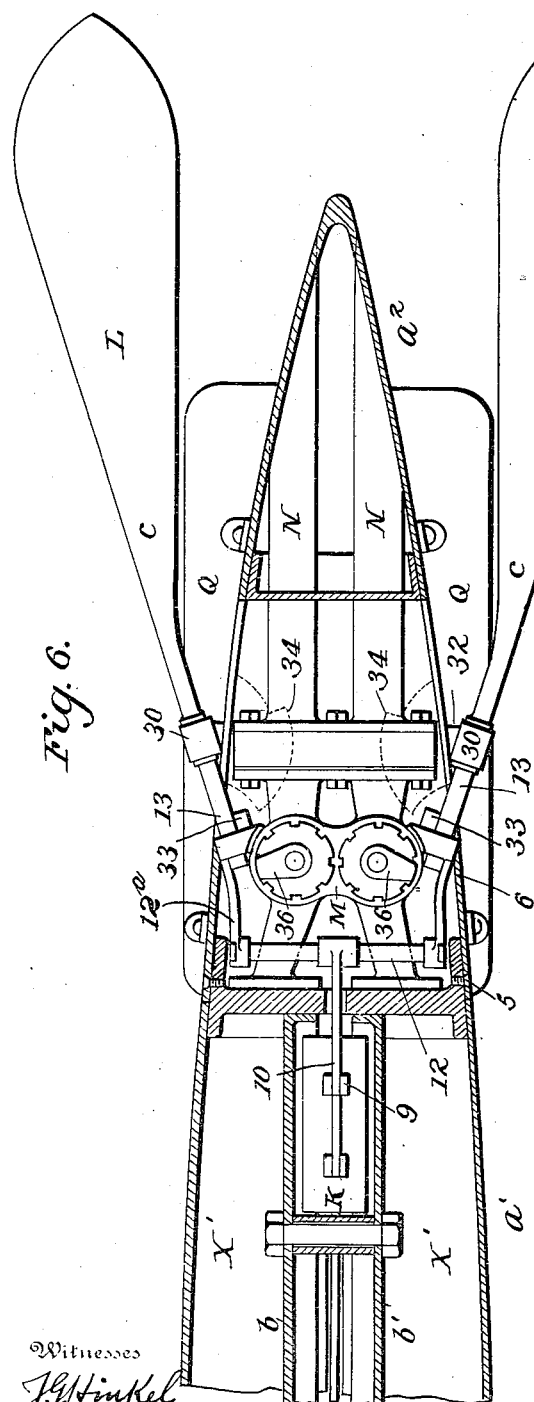
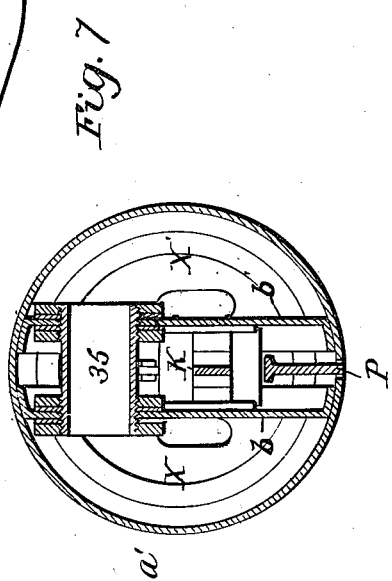
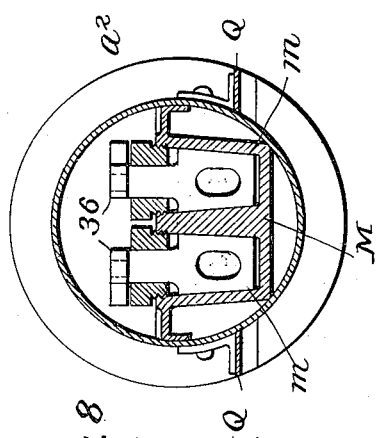

UNITED STATES PATENT OFFICE.

THOMAS WEMYSS JUST, OF NEW YORK, N. Y., ASSIGNOR TO MARY JOSEPHINE ALSBAU, OF SAME PLACE.

TORPEDO.

SPECIFICATION forming part of Letters Patent No. 638,463, dated December 5, 1899.

Application filed January 26, 1899. Serial No. 703,506. (No model.)

*To all whom it may concern:*

Be it known that I, THOMAS WEMYSS JUST, a citizen of the United States, residing at New York, (Brooklyn,) in the county of Kings and State of New York, have invented certain new and useful Improvements in Torpedoes, of which the following is a specification.

My invention relates to torpedoes; and it consists in constructing a torpedo in sections and in means for propelling and directing the sections automatically and for facilitating and aiding in the discharge of the sections, all as fully set forth hereinafter and as illustrated in the accompanying drawings, in which—

Figure 1 is a longitudinal sectional elevation of a torpedo embodying my invention. Fig. 2 is a side elevation. Fig. 3 is a longitudinal sectional elevation, enlarged, of the head and forward section of the main body of the torpedo; Fig. 4, an enlarged longitudinal section of the central section of the main body; Fig. 5, an enlarged longitudinal section of the rear section of the main body; Fig. 6, a sectional plan of the part shown in Fig. 5, the rudders swung to the rear. Fig. 7 is a transverse section on the line 4 4, Fig. 4. Fig. 8 is a transverse section on the line 5 5, Fig. 5. Fig. 9 is a longitudinal section showing the torpedo as arranged in a gun prior to firing.

The torpedo may be of any desired proportions and general outline, but as shown is a double cone or cigar-shaped, and consists of a main portion A and a pointed head B, constituting for certain purposes one structure, but the two parts capable of acting independently.

The main portion A is pointed at both ends and adapted at the forward end to a corresponding socket in the rear of the head B, the latter when in place being temporarily locked in position upon the main portion A. Any suitable locking devices may be used; but as shown there are two bolts $v\ v$ sliding through the inner shell of the head, their ends projecting into recesses $w$ in the end of the main portion A. In the head B is a chamber D, which may be filled through an opening $e$, provided with a self-closing or check valve $e'$, with air or gas under any desired pressure, and this pressure upon the inner ends of the bolts $v$ tends to throw them inward to engage the recesses $w$, while it permits the bolts to move outward under the pressure exerted upon their inner ends as they slide over the tapering end of the main portion A.

In order to insure the withdrawal of the bolts when the head is to be separated from the main portion, each bolt is connected with a lever D', pivoted within the chamber D, and from the opposite end of each lever extends through a packed opening in the shell of the head a pin S, which operates as described hereinafter.

The head is provided with a forward compartment C, in which is stored any suitable explosive, which may be inserted through an opening in the end of the head, closed by any suitable cap-piece F, and at the end of the latter may be any suitable detonator or exploder $f$, insuring the ignition of the charge upon the contact of the exploder or at any suitable interval after said contact.

The head of the main portion A is provided with a chamber H, in which may be placed any desired explosive material inserted through an opening at the end, provided with a cap-piece F' and with a detonator or exploder $f'$.

Preferably the main portion A of the shell consists of three sections $a\ a'\ a^2$, separated by partitions G G' and connected detachably together. For instance, the partition G has a threaded socket adapted to receive the threaded projection 4, extending from the rear end of the end section $a$, and the open forward end of the shell 6 of the rear end section $a^2$ may extend over the partition G' and be bolted thereto by detachable screws or bolts 5. By thus making the main body of the torpedo in sections (which may be of greater or less number than three) I facilitate transportation or storage. Preferably the threaded portions 3 4, connecting the detachable sections $a\ a$, are provided with interrupted screw-threads, so that the parts may be connected or disconnected by a partial revolution of said parts. The central section $a'$ is provided with two separated longitudinal partitions $b\ b'$, the central chamber thus formed receiving a center-board P, pivoted at the forward end and which may be swung up within the outline of the body, as in Figs. 1 and 4, or dropped down automatically to the position shown in Fig. 2 to assist in the maintenance of the equilibrium and course of the torpedo in operation.

The depth to which the torpedo attains may be regulated by means of two side wings Q Q, secured adjustably to the outside of the shell of the rear or tail portion, as shown in Figs. 2 and 6, the said wings being set at any desired angle, according to the extent to which it is desired to have the torpedo enter the water.

The torpedo is maintained at a prearranged degree of immersion, so as to travel at a predetermined distance below the water-surface, by means of two rudders L L, each pivoted at a point outside the tail portion of the torpedo to swing freely and regulated in their action by a gravity-balance of suitable character. For instance, as shown, the said gravity-balance consists of a horizontally-disposed weighted lever K, pivoted intermediate its ends in the central chamber of the section $a'$ to a transverse bolt 8, with the center of gravity below the pivot, which insures that the lever retains its horizontal position. The lever is connected by a link 9 with a lever 10, pivoted at $10^a$ and having a cross-bar 12 rigidly secured to its free end. The bar 12 is provided with two arms $12^a$, the ends of which have recesses $12^b$, Fig. 4, to receive the forward ends of the shafts 13 of the rudders L L when the latter are in operative position. The recesses $12^b$ preferably flare both forwardly and rearwardly, as shown, and are open on one side as well as at the ends.

Each rudder has a blade $c$ connected with the shaft 13, and the latter turns in the socket of a link 30, pivoted transversely to a vertical pin 31, turning in a side bracket 32, and the side of the section $a^2$ is slotted so that the rudder can swing forward (see dotted lines, Fig. 1) to bring its blade against the body-section $a'$, to which it conforms transversely, or can be carried back to operative position, as shown in Figs. 2 and 6. In thus swinging to operative position it is necessary to turn or feather the rudder to bring the blade to a horizontal position as it moves back. This may be effected by different devices; but, as shown, the shaft has a lug 33, which as the rudder swings back rides under an inclined plate or bearing 34, which depresses the lug, turning the shaft and its blade.

As shown in Figs. 1, 5, and 6, each shaft 13 of the rudders L has a lug or projection 33 on its circumference. An inclined bearing 34 is arranged in the path of this lug, so that when the rudders are turned to or from their operative positions in engagement with the forked ends of the cross-bar arms the lug 33 will be given a motion of rotation by contact with the inclined plane in addition to its revolutionary movement, and this movement of rotation will be imparted to the shafts 13, thus causing the rudders to be feathered or the blades thereof to turn into a different plane. Therefore the rudder may be swung forward to the position shown in dotted lines in Fig. 1 close against the main body of the torpedo, being thus supported when the torpedo is not in use, so as not to occupy room and be out of the way of injury; but when the torpedo enters the water the latter, catching the forward free ends of the rudders, will swing them outward and back to their operative position, (shown in Figs. 2 and 6,) and the action of the gravity-balance K under any deflection of the torpedo will vibrate the rudders, so as to change the course and overcome the deflection. For instance, suppose the torpedo should take an upward course the rear end of the gravity-lever will be brought nearer to the upper surface of the torpedo, which will result in lifting the free end of the lever 10, the cross-bar 12, and the arms $12^a$. This will effect the upward movement of the shafts 13 in advance of the pins 31 upon which they are pivoted, and consequently the rudders L L will be moved downwardly and will cause the torpedo to return to a horizontal course.

The side chambers X' X' of the central section $a'$ communicate through a tube 35 and together constitute a chamber which is stored with air under pressure through an opening provided with a ball or check valve 17, and in the tail compartment are arranged tubes N N, extending horizontally on opposite sides of the central line, open at the rear ends and provided with valves and with means for opening these valves after the torpedo enters the water, so as to permit the contained air to pass rearwardly through the tubes and aid in the propulsion of the torpedo in the water. Any suitable means may be employed for opening the said valves, which may be arranged in any desired position. As shown, there are two valves $m$ $m$ in a casing M, communicating with the chamber X' and with the tubes N N, and means is provided whereby the reversal of the fore and aft position of the rudders L L turns these valves to discharge the air into the tubes N N. While any suitable connection may be employed to effect this result, I prefer to turn the valves through the medium of the rudders as the latter shift their position. Thus each valve-stem has an arm 36, and as the rudder swings toward the position shown in Figs. 2 and 6 the end of the shaft 13 strikes said arm 36 and swings it forward, turning the valve and permitting the air to pass to the tube N.

As shown in Figs. 1, 5, 6, and 8, the valve-stem arm 36 is adapted to extend out into the path of the end of the shaft 13 of each of the rudders, so that when the latter is swung around on its pivot 31 the end of the shaft 13 will strike the arm 36, whereby the stem will be operated to open the valve $m$.

When the torpedo is to be used, assuming the chambers to be properly charged with explosives, the parts are placed in the position shown in Fig. 1, the air-chambers are filled with air under the requisite pressure, and the torpedo is placed in the bore of a gun, Fig. 9, having longitudinal recesses $x$, adapted to receive the ends of the pins S, and terminating toward the muzzle of the gun in inclined portions $x'$, merging into the face of the bore, so that as the torpedo moves forward the pins S on reaching the inclines $x'$ will be forced inward, thereby withdrawing the bolts $v$ from the recesses $w$ and permitting the detachment of the head B from the body A of the torpedo. After the torpedo is inserted in the gun there is also inserted a sabot Y. In firing the torpedo from the gun the sabot Y is applied to the rear end of the torpedo, the said sabot being recessed to receive said end and having lateral recesses for spring-pins 20, which enter the grooves $x$ of the gun and prevent the escape of gases past the sabot and which as the sabot passes outward are pressed inward by the small inclines $x'$. At the top of the sabot is a rib $y$ with a forward inclined end adapted to engage the lower end of a stem 21 of a valve 22, closing a port leading to the interior of the gun from a compressed-air chamber 24 in the gun. Compressed air or other gas being admitted behind the sabot, the latter and the torpedo are propelled forward in the gun, the pins S S 20 20 sliding along the grooves $x$. On the arrival of the head B in the proper position the pins S S are forced inward, opening the ports $v$ and unlocking the head from the body of the torpedo, when the air from the chamber D will enter between the head and the forward end of the body A and impart to the head B a sudden impetus forward, so that the head leaves the gun in advance of the main body and may take its course with a long trajectory above the water toward the object to be hit, while the main body of the torpedo will pass into the water with a short trajectory, will be deflected forward by the wings Q', guided by the rudders, and will strike the said object below the water-line. The recoil on projecting forward the head B does not reduce the velocity of the main body A, because the projection $y$ of the sabot lifting the valve 22 admits an additional supply of compressed air behind the torpedo, overcoming the effect of the reaction of the air from the head B and imparting greater velocity to the body portion. The incline or rib $y$ may be upon the body of the torpedo instead of on the sabot. When the main body after leaving the gun strikes the water, the rudders L L will spring back from their forward position to their aft position, at the same time feathering themselves and liberating compressed air through the discharge-pipes N N. These streams of air impinge against the water and impel the torpedo forward through the water, the gravity-balance acting upon the rudders to properly direct the course of the torpedo.

While I have described the features in connection with the main body and the separable head as used conjointly, it will be evident that some of these features could be used in connection with torpedoes which do not consist of separable portions, and also that the torpedo with separable parts may be constructed in various ways and that the self-propelling detachable head may be used with body portions of various different constructions.

I do not here claim the construction of gun shown, which constitutes the subject of a separate application, Serial No. 703,507.

Without limiting myself to the precise construction and arrangement of parts shown, I claim as my invention—

1. The combination in a torpedo, of a body portion, a head detachably connected with said body portion, and locking devices and means for operating the latter automatically to release the head on firing the torpedo, substantially as set forth.

2. The combination in a torpedo, of a body portion having a pointed end, a head also with a pointed end and detachably connected with said body portion, and locking devices and means for operating the latter automatically to release the head on firing the torpedo, substantially as set forth.

3. The combination in a torpedo, of a body portion, a head recessed to receive the end of the body portion, and locking devices and means for operating the latter automatically to release the head on firing the torpedo, substantially as set forth.

4. The combination in a torpedo, of a body portion and a head separable therefrom, each portion with a chamber containing an explosive, and an exploder, locking devices for locking the head and body together, and means for operating the latter automatically to release them on firing the torpedo, substantially as set forth.

5. The combination in a torpedo, of a body portion and a separable head with a pointed end, each portion with a chamber containing an explosive, and an exploder, locking devices for locking the head to the body, and means for operating the devices automatically to release them on firing the torpedo, substantially as set forth.

6. The combination in a torpedo, of a body portion and a head recessed to receive the end of the body portion, each portion with a chamber containing an explosive and an exploder, locking devices for locking the head and body together, and means for operating the latter automatically to release them on firing the torpedo, substantially as set forth.

7. The combination with the pointed main body of a torpedo, of a pointed head recessed to receive the end of the body, said head provided with an air-chamber, and with means of ejecting the air therefrom between the body and head, substantially as set forth.

8. A torpedo provided with a head separable from the body portion and having a chamber for compressed air, and ports arranged to permit the escaping air from said chamber to aid in the propulsion of the head, substantially as set forth.

9. A torpedo provided with a head separable from the body portion and having a chamber for compressed air, ports arranged to permit the escaping air from said chamber to aid in the propulsion of the head, and valves controlling said ports, and valve-operating devices, substantially as set forth.

10. A torpedo, provided with a head separable from the body portion and having a chamber containing an explosive and also a chamber for compressed air, and ports arranged to permit the escaping air from the last-named chamber to aid in the propulsion of the head, substantially as set forth.

11. The combination in a torpedo, of a body portion, a head with a pointed end and recessed to receive the end of the body portion, each portion with a chamber containing an explosive, and also with a chamber containing air under pressure, means for releasing the air to aid in propelling the said head portion, locking devices for the head, and means for operating the latter automatically to release them on firing the torpedo, substantially as set forth.

12. The combination with a torpedo having an air-chamber and openings arranged for the rearward ejection of the air from said chamber, of valves controlling the flow of air through said openings, devices arranged to be shifted as the torpedo enters the water, and connections between the devices and valves whereby the latter are shifted, substantially as set forth.

13. The combination with a torpedo, of rudders pivoted thereto, adapted to be swung forward against the sides of the torpedo and to be swung rearwardly into operative positions by the water when the torpedo is launched, and means for changing the plane of each rudder from vertical to horizontal and vice versa, substantially as described.

14. The combination with a torpedo having an air-chamber, of openings arranged for the rearward ejection of the air, valves controlling the flow of air to said openings, rudders for guiding the torpedo adapted to be swung forward and to swing back as the torpedo reaches the water, and connections for operating the valves on the said movements of the rudders, substantially as set forth.

15. In a torpedo, the combination with the main portion thereof, of shafts pivoted thereto, and rudders supported by said shafts adapted to be swung forward against said sides and to be swung into operative positions by the water after the torpedo is launched, and means whereby said shafts are rotated during the swing, substantially as described.

16. The combination of a torpedo-body, two rudders pivoted at the sides near the rear thereof, a horizontally-disposed gravity-balance pivoted intermediate its ends within the torpedo-body and hung to maintain its normal position irrespective of the inclination of the torpedo-body, and link and lever connections directly between one end of the gravity-balance and the rudders, whereby the latter are automatically operated when the torpedo-body assumes an inclined position relative to the gravity-balance, substantially as set forth.

17. The combination with a torpedo, of rudders pivoted thereto to swing forward and lie in vertical planes against the body and to swing back under the action of the water, and adapted to be turned into horizontal planes as they swing to the rear, substantially as set forth.

18. The combination with a torpedo, of rudders pivoted thereto to swing forward and lie against the body and to swing back under the action of the water, an air-reservoir, tubes communicating with the air-reservoir, valves, and means for turning the latter by the movement of the rudders, substantially as set forth.

19. A torpedo provided with wings Q Q and with rudders, and a horizontally-disposed gravity-balance pivoted intermediate its ends within the torpedo and connected to the rudders to operate the latter on any variation in the inclination of the torpedo, substantially as described.

In testimony whereof I have signed my name to this specification in the presence of two subscribing witnesses.

THOMAS WEMYSS JUST.

Witnesses:
W. CLARENCE DUVALL,
CHARLES E. FOSTER.